Feb. 23, 1971   P. T. KAVANAGH   3,564,943
DRILLING MACHINE WITH TURRET HANDLING MEANS
Filed Nov. 27, 1968   3 Sheets-Sheet 1

INVENTOR
PAUL TERENCE KAVANAGH
BY Blascock, Downing &
Seebold
ATTORNEYS

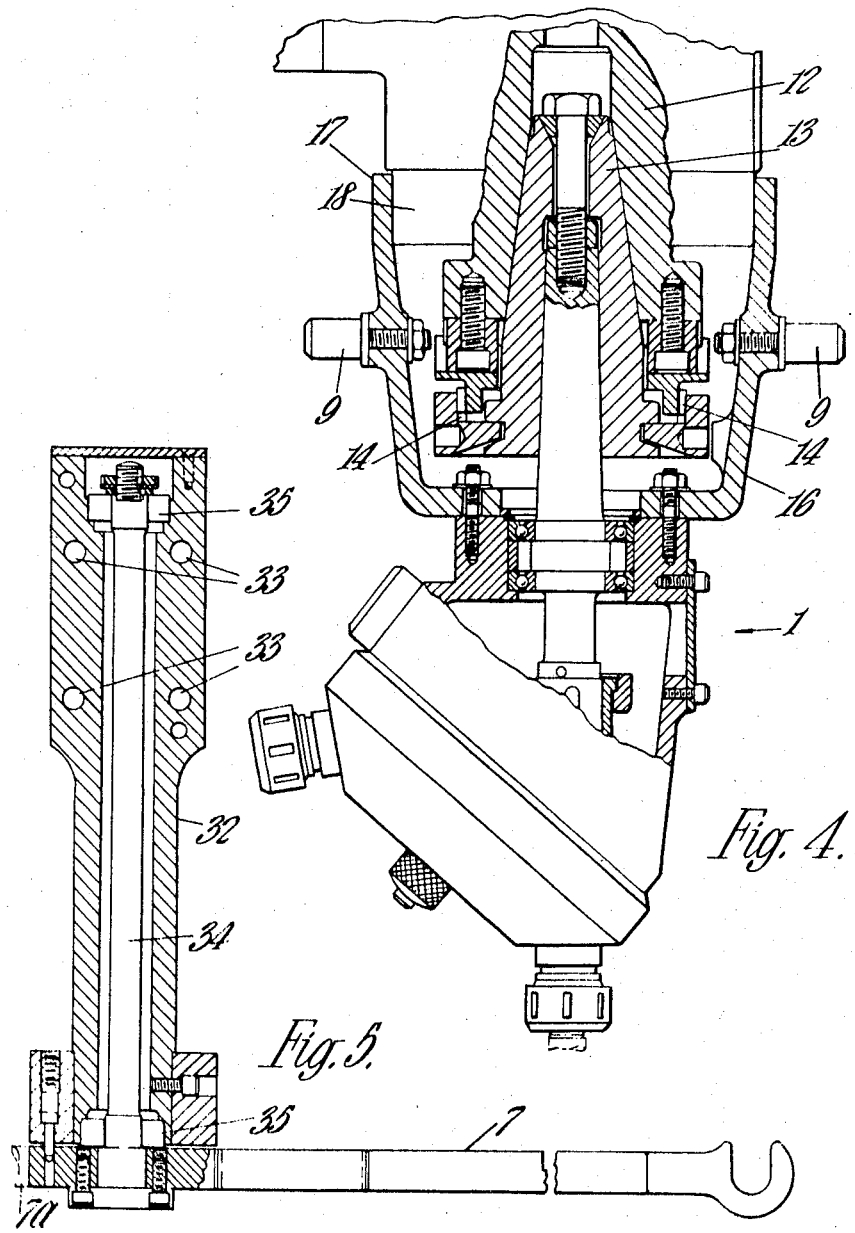

United States Patent Office 3,564,943
Patented Feb. 23, 1971

3,564,943
DRILLING MACHINE WITH TURRET HANDLING MEANS
Paul Terence Kavanagh, London, England, assignor to Kavanagh O'Moore & Company Limited, London, England, a British company
Filed Nov. 27, 1968, Ser. No. 779,342
Claims priority, application Great Britain, Aug. 26, 1968, 40,741/68
Int. Cl. B23b 39/20
U.S. Cl. 77—25      3 Claims

ABSTRACT OF THE DISCLOSURE

An automatically controlled drilling machine having an indexing turret provided with its own indexing means, which is interchangeable for another such turret, or a single tool, to extend the range of tools usable upon a workpiece, as required by the programme controlling the machine. The turret, or a plurality of turrets are supportable upon a hingeable arm or other support means, so as to be movable and stored out of the way, and can be brought selectively adjacent the spindle quill assembly of the machine, for attachment thereto as and when required.

The hingeable arm, when used, may incorporate a spring for assisting in the lowering and raising of the turret during disconnection from and connection to the machine.

When the signals controlling the indexing turret are of the electric kind, the signals are conveyed by a flexible cable attached to the turret by plug and socket means. Where the signals are hydraulic or pneumatic, they are conveyed by a flexible pipe connected to the turret by snap-type connectors.

BACKGROUND OF THE INVENTION

The invention relates to drilling machines, and in particular to drilling machines adapted to use a turret.

Prior to the advent of an automatic control of machine tools, the time required to change tools during the course of a manufacturing process, was not of particular significance, seeing that, of the total time for a cycle of operations, positioning of the workpiece or the tool occupied the greatest part. Furthermore, since the machine tool was manually controlled, there was always an operator available to change tools as part of the operation of the machine.

Since the introduction of automatic control of the operation of machine tools, positioning of the workpiece or tool occupies a mere fraction of the time it took by manual operation, with the result that the time spent changing tools has become significant as a proportion of the total working cycle.

It has been proposed heretofore to take advantage of the increased speed of working of the tool, by providing tool changers of varying complexity which usually draw on a tool magazine, but they are inherently complicated, because of the number of working parts provided, and it follows that such automatic tool changing devices are expensive, so much so, that if applied to a small automatic machine tool, the tool changer could cost more than the machine that does the work.

The consequence of this is that up to the present time there are available small automatic machines only, without any form of automatic tool change arrangement, or with an indexible turret as an integral part of the machine limited to the number of tools which can in practice be carried in a turret, normally eight.

A recent study has disclosed that 59% of the components offered on an average to a small machine for drilling, spot-facing, counter-sinking, tapping, etc., required from 2 to 6 tools, 15%—7 to 12 tools, 18%—1 tool and the remaining 8%—12 or more tools.

It follows from this analysis that 77% of the components offered to a small automatically controlled drilling machine equipped with an indexing turret carrying 6 tools can be dealt with, but this is a serious limitation, and the object of the present invention is to provide an automatically controlled drilling machine with an indexing turret having simple means for increasing the number of tools which can be used.

Although the invention is particularly suitable for incorporation in small drilling machines, it can also be applied with advantage to machines of other sizes.

SUMMARY OF THE INVENTION

The invention consists in a drilling machine of the kind having an indexing turret, and a spindle quill assembly constructed for the attachment and detachment of a turret in which an articulated temporary support means is provided and upon which a turret may rest while being moved to and from the quill assembly and during attachment and detachment therefrom, to assist in the substitution of a turret for another turret or a single tool as the porgramme of work to be carried out demands.

The invention still further consists in a drilling machine as set forth in the preceding paragraph, in which the support means comprises a carrier arm having a stirrup which is engageable with projections each side of the turret to support the turret, the carrier arm being articulated about a substantially vertical axis to move the turret in a horizontal plane and articulated about a horizontal axis to raise and lower it relative to the spindle quill assembly of the drill head.

The invention still further consists in a drilling machine as set forth in the preceding paragraph, in which the carrier arm is movable about the horizontal axis in a downward direction against the action of a spring.

The invention still further consists in a drilling machine as set forth above in which the carrier arm has a plurality of stirrups, each of which can support a turret.

BRIEF DESCRIPTION OF THE DRAWINGS

The accompanying drawings show, by way of example only, one embodiment of the invention in which:

FIG. 4 is a view in part section and part elevation through the spindle quill assembly of the drill head and the turret spindle-unit attached thereto;

FIG. 5 is a view in part section and part elevation of part of the carrier arm and stirrup.

The drilling machine illustrated is of the numerically controlled kind, and can be caused to follow a programme perforated on paper tape, and an uninterrupted sequence of operations using the six tools upon the spindles of the turret at that time attached to the spindle quill assembly of the drill head. When that part of the programme is complete, the machine automatically stops and the operator removes that turret head and substitutes therefor either a further turret head loaded with tools suitable for the next stage of the programme, or places a single tool in the main spindle of the head as required. This procedure is carried out in a simple and expeditious manner, as will be evident from the following description.

The drilling machine need not be of the numerically controlled kind, and can be controlled to follow a predetermined programme by other suitable control means.

The turret or each turret spindle-unit is self-contained and is provided with its own indexing mechanism controlled by signals received by way of a flexible cable connected thereto by a plug and socket.

Figure 1:
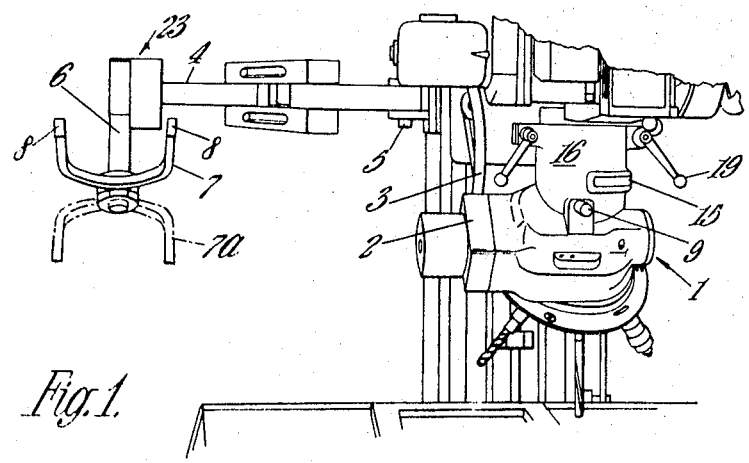
FIG. 1 is a perspective view of part of a numerically controlled drilling machine showing an indexing turret spindle-unit in position upon the machine.

In FIG. 1, a multi-spindle turret 1 is shown attached to a spindle quill assembly of the drill head of the machine, ready for carrying out each of six operations determined by the tools upon the spindles of the turret, with the choice of the appropriate tool being made by an indexing mechanism 2 formed as part of the turret, and controlled by signals received by way of a flexible cable 3.

The machine is provided with an articulated carrier arm having a horizontal portion 4 hinged to the machine at 5, and provided with a pendant portion 6 to which is hingeably attached a stirrup 7 provided with hooked ends 8, which are engageable under lifting bollards 9, with one bollard being located on each side of the turret 1 as shown in FIG. 4.

Figure 2:
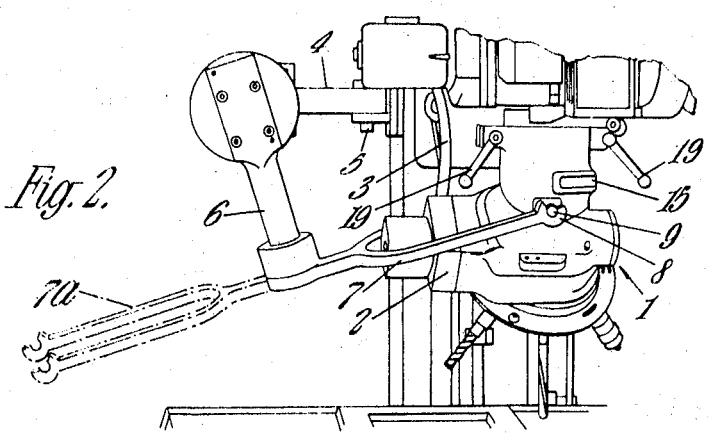
FIG. 2 is a perspective view showing a carrier arm in position to receive the turret spindle-unit when detached from the machine.

To remove the turret from the machine, a plug 10 on the cable 3 is removed from a socket 11 on the back of the turret, the stirrup 7 is brought around and the hooks 8 are engaged under the bollards 9 as shown in FIG. 2. The turret is unfastened from the head of the machine, in a manner to be described hereinafter, and the weight of the turret is taken by the stirrup and arm, and can be moved to a position out of the way as shown in FIG. 3.

Figure 3:
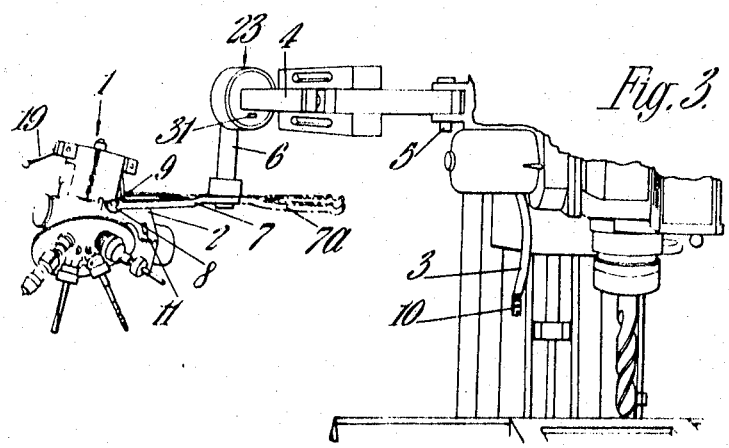
FIG. 3 is a perspective view showing the turret head moved out of the way, and a heavy duty drill in position in the main spindle of the machine.

The programme can now be continued with a single tool in the main spindle of the machine as shown in FIG. 3.

For programmes requiring a multiplicity of small tools, and greater than the variety which can be accommodated in one turret, the carrier arm 6 may be provided with a further stirrup 7a, which can support a second turret, or even three further stirrups in a cross formation accommodating four turrets in all, which can be brought to and attached to the head of the machine alternatively.

In order that the turret shank should make a truly concentric connection with a main spindle 12 of the head of the machine, it is provided with a tapered adaptor 13 (FIG. 4), which is driven into its co-acting tapered part by inter-engaging threads 14. The drive is connected and disconnected by means of a tommy-bar inserted by way of a slot 15 in a housing 16 of the turret to tighten up the inter-engaging threads 14. An upper part 17 of the housing 16 is formed as a split circular skirt, which encircles the non-rotating quill of housing 18 of the head, and is locked in position thereon by means of lever operated clamps 19. It is therefore a simple matter for the turret, complete with its indexing means, to be disconnected from and connected to the head of the machine, and occupies only a few seconds, when most of the weight is taken by the stirrup 7.

Figure 6:
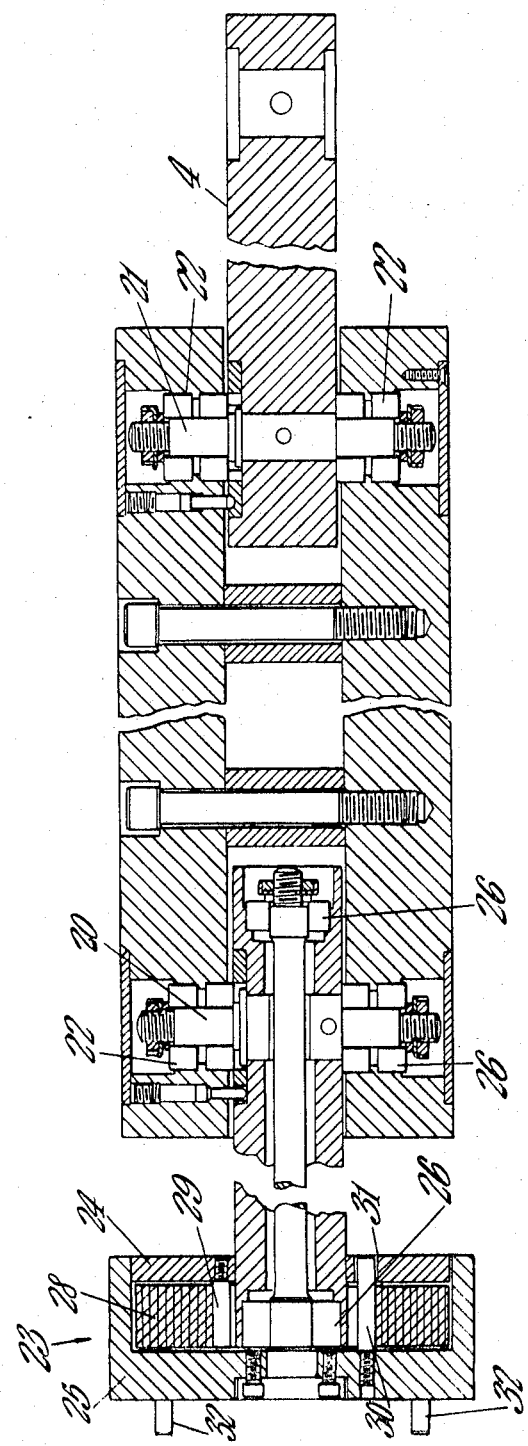
FIG. 6 is a view in longitudinal section of the remainder of the carrier arm.

The horizontal portion 4 of the support arm is shown in FIG. 6, and has two intermediate hinged joints comprising pins 20 and 21 and taper roller bearings 22, and in consequence a very free articulated movement is provided. the outer end of the horizontal portion 4 carries a hollow drum-like boss 23 comprising a fixed end 24 and a rotatable cup-like portion 25 supported on taper roller bearings 26 on a spindle 27 from the arm 4.

The cup-like portion 25 houses a powerful helical clock-like spring 28, the inner end of which is hooked around a pin 29 fastened to the fixed end 24, while the outer end of the spring is hooked around a similar pin (not shown), which is fastened to the cup-like portion in such a way that the latter is urged to rotate in a counter-clockwise direction as viewed in FIG. 2, and in consequence applies an upwardly directed force to the hooks 8 of the stirrup 7. The amount of rotational movement of a cup-like portion 25 is limited by the pin 30 working in an arcuate slot 31 in the fixed end 24.

The cup-like portion 25 carries a vertical part 32 of the carrier arm on pins 33, in the upper part of the latter, with part 32 having an axial bore in which is positioned a spindle 34 supported in bearings 35. The stirrup 7 is fastened to the lower end of spindle 34, and is rotatable about the axis of the spindle 34.

However many stirrups there are provided, the helical clock-like spring 28 acts to urge upwardly that stirrup which is turned nearest to the head of the machine, and the action of which is assisted should there be a further turret on the opposite side of the vertical part 32 of the carrier arm.

With the arrangement proposed in accordance with the invention, it is possible to construct a drilling machine which provides for the use of a range of tools in a programme far greater in number than is possible with any small drill proposed heretofore, by reason of the provision of support means for interchanging one turret for another turret or a single tool, quickly and easily.

Although heretofore the support means for the turret or turrets has been described as being an articulated support arm, other support means can be provided alternatively, such as an extensible and contractible arm, a system of arms, or slide means and so on, while the support means does not necessarily have to be attached to the drilling machine, but can be, for example, supported independently from the floor, but works in co-operation with the machine, while other details for carrying the invention into effect may be varied without departing from the scope of the invention.

I claim:

1. A drilling machine including a drill head having a spindle quill assembly by which a turret or tool is attached to or detached from the drill head, an articulated temporary support means, said support means comprising a carrier arm having a stirrup engageable with projections on each side of the turret to support the turret, the carrier arm being articulated about a substantially vertical axis to move the turret in a horizontal plane and articulated about a horizontal axis to raise and lower the turret relative to the spindle quill assembly of the drill head, and means mounting said temporary support means for movement toward and away from the spindle quill assembly and upon which a turret may rest during movement toward and away from the quill assembly and during attachment and detachment from said spindle quill assembly, to assist in the substitution of a turret for another turret or a single tool, as the programme of work to be effected demands.

2. The drilling machine as claimed in claim 1, including a spring against which the carrier arm is movable about the horizontal axis in a downward direction.

3. The drilling machine as claimed in claim 1, in which the carrier arm has a plurality of stirrups, each of which is adapted to support a turret.

References Cited

UNITED STATES PATENTS 1,536,730    5/1925    Sears _____ 77—25X

FRANCIS S. HUSAR, Primary Examiner

U.S. Cl. X.R.

29—57; 77—55; 214—1